United States Patent [19]

Abstein, Jr. et al.

[11] 4,181,026
[45] Jan. 1, 1980

[54] QUASI-RANDOM PNEUMATIC VIBRATION FACILITY AND AUTOMATIC FREQUENCY MODULATING SYSTEM THEREFOR

[75] Inventors: Henry T. Abstein, Jr., Roseburg, Oreg.; Dennis B. Page, Redondo Beach, Calif.; James M. Kallis, Los Angeles, Calif.; Charles F. Talbott, Jr., Chatsworth, Calif.; Richard L. Baker, Rancho Palos Verdes, Calif.

[73] Assignee: Hughes Aircraft Company, Culver City, Calif.

[21] Appl. No.: 897,821

[22] Filed: Apr. 19, 1978

[51] Int. Cl.$^2$ ............................................. G01N 29/00
[52] U.S. Cl. ........................................................ 73/665
[58] Field of Search ................. 73/665, 663, 664, 666, 73/667, 668

[56] References Cited

U.S. PATENT DOCUMENTS

| | | | |
|---|---|---|---|
| 2,773,482 | 12/1956 | Dickie | 73/665 X |
| 3,157,045 | 11/1964 | Maki | 73/664 |
| 3,686,927 | 8/1972 | Scharton | 73/665 |

*Primary Examiner*—Jerry W. Myracle
*Attorney, Agent, or Firm*—Lewis B. Sternfels; W. H. MacAllister

[57] ABSTRACT

A low-cost, multi-axis, quasi-random vibration system includes pneumatically driven vibrators coupled to a resonating, self-attenuating shaker structure to achieve a frequency spectrum and acceleration-level control of a broadband quasi-random vibration output in the frequency range, for example, from 40 Hz to 2 kHz for vibration testing of equipment. The shaker structure consists of flexible interconnected structures whose primary or driving structure acts to mechanically process the vibratory input of the coupled vibrators and whose supporting or driven structure supplies a further vibrational processing to supply the test item with multi-axis multimodal input. Automatic control and pseudo-random modulation of air pressure of the pneumatic vibrators provide closed-loop broadband acceleration-spectrum control and spectrum smearing to enhance frequency content and to prevent the shaker from locking onto any particular vibration frequency, especially a natural frequency of the shaker. Control is achieved in and about three orthogonal axes simultaneously, thus affording a realistic simulation of operational environments. The vibrators' vibration frequency is modulated by means of a variable-area orifice in the pneumatic line located between the air supply and the pneumatic vibrators. A pseudo-random change in the orifice area is made automatically, for example, every 2 to 3 seconds, by a preprogrammed microprocessor-controlled flow control mechanism.

13 Claims, 10 Drawing Figures

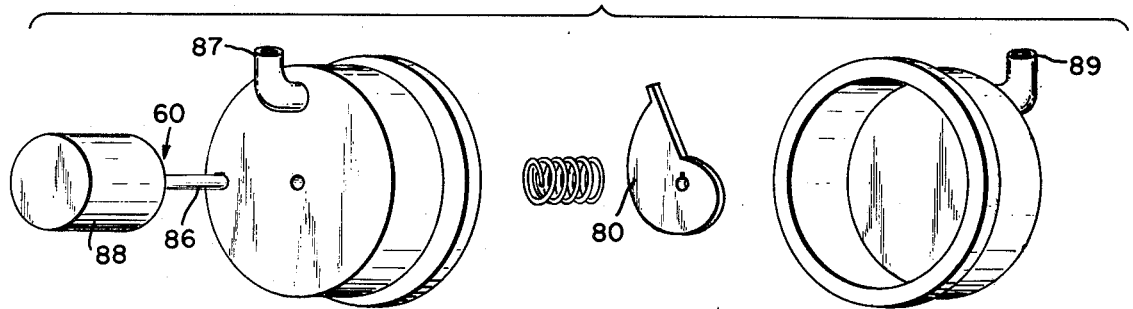
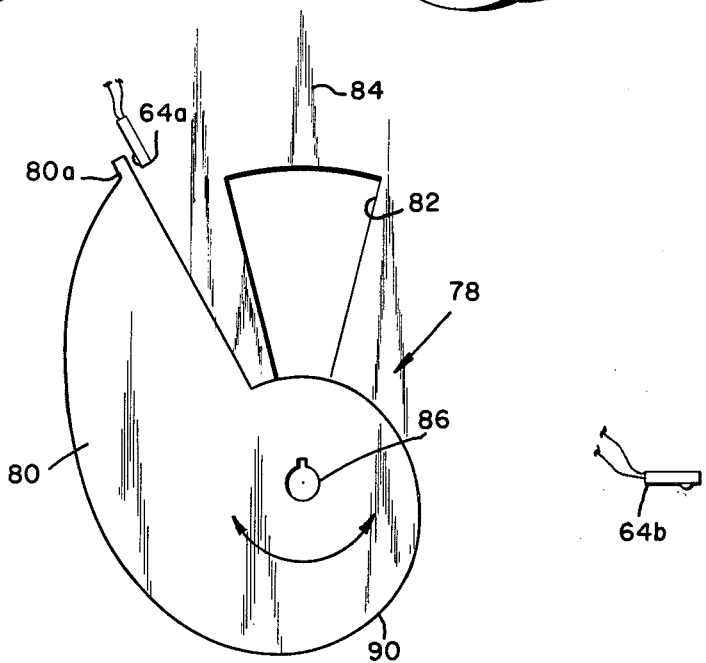
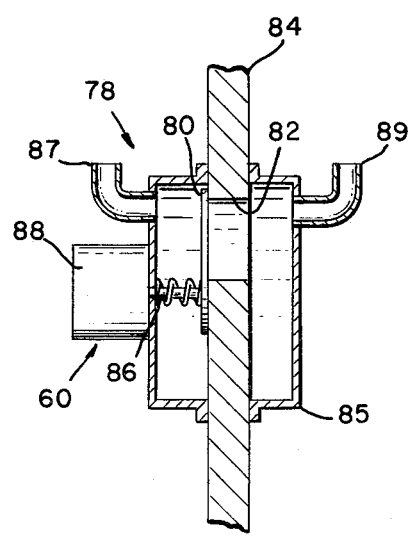

QUASI-RANDOM PNEUMATIC VIBRATION FACILITY AND AUTOMATIC FREQUENCY MODULATING SYSTEM THEREFOR

BACKGROUND OF THE INVENTION

1. Field of the Invention

The present invention relates to vibration test equipment employing pneumatic vibrators and incorporating automatic frequency modulation, e.g., for proof of workmanship, for operational screening, and for engineering development tests.

As used herein, the terms "quasi-random" and "pseudo-random" are defined as follows. "Quasi-random" vibration can be described as a line spectrum with equally spaced lines, e.g., harmonics, whose fundamental frequency varies randomly with time within a restricted frequency range, e.g., vibrator frequency excursion during modulation, which, in turn, causes a random fluctuation in the amplitudes, (e.g., accelerations) at the spectral lines. The fundamental frequency fluctuates sufficiently to produce an essentially continuous spectrum when averaged over a long enough time interval. By "pseudo-random", it is meant that there is a mathematical method or algorithm for selecting a sequence of numbers, e.g., for use in modulating the driving means for the vibrators. "Pseudo" means that the randomness is not purely random because the sequence results from predetermined calculations.

Also as used herein, the terms "multi-degree-of-freedom", "spectrum" and "multi-modal" are defined as follows. "Multi-degree-of-freedom" is used to define the ability of structure to translate and rotate in several directions simultaneously within given bounds. "Spectrum", e.g., as in "intense vibration spectrum", means the cumulative time history of the vibration (e.g., in $G^2/Hz$) as related to the frequency associated with a particular level of vibration. "Multi-modal" means the simultaneous occurrence of many structural vibrational modes, or dynamic displacements.

2. Description of the Prior Art and Background Considerations

In the prior art, vibration screening of equipment, e.g., airborne radar units, infrared sensors and missiles, was accomplished by single-axis mechanical vibration apparatus working with fundamental frequency of excitation and uncontrolled harmonics. Alternatively, electrodynamic shakers and control systems were employed for single-axis or, in groups, multi-axis testing. Such systems are very expensive, and multi-axis configurations present problems as to the coherence of acceleration inputs.

The use of multiple pneumatic vibrators for the simulation of random vibration was first suggested by General Dynamics. Corporation in a paper in *Shock & Vibration Bulletin*, No. 46, Part 3, August 1976, pp. 1–14. This paper describes a missile test in which nine pneumatic vibrators are attached directly to a freely suspended missile. An approximation of measured in-flight random vibration was obtained. Frequency spectrum and acceleration level were determined by the number and size of the attached vibrators and the mean air pressure. The supply pressure was modulated in a periodic fashion to prevent locking on the first bending mode of the missile structure and to fill in the frequency spectrum. In a panel discussion reported in the *Journal of Environmental Sciences*, November/December 1976, pp. 32–38, Westinghouse Electric Corporation discloses development of a pneumatic vibrator system for testing avionics equipment. Pneumatic vibrators are said to be attached directly to rigid vibration fixtures to achieve a two-axis excitation. Air pressure is modulated to minimize the line spectrum. Major emphasis is aimed at achieving significant vibration energy content at frequencies below 500 Hz.

Other prior work in relevant technology is disclosed in U.S. Pat. Nos. 4,011,749; 3,686,927 and 3,710,082.

U.S. Pat. No. 4,011,749 describes a multi-degree-of-freedom shaker whose rigid test table is given time-variant displacements by a complex hydraulic actuation system with six degrees of freedom. The shaker is controllable at the expense of great complexity and mass.

U.S. Pat. No. 3,686,927 discloses a method for coupling selected plates, beams, or concentric cylinders with other beams or resonating intermediate structure to effect multi-modal vibration fields for test articles. The system described is controlled by excitation frequency and amplitude only.

U.S. Pat. No. 3,710,082 describes a method of controlling vibrations to a pre-determined frequency content by digitally sensing the vibration response (analog plus analog to digital converter), determining the frequency domain (Fourier transform), comparing it with a pre-determined spectrum, combining it with (by multiplying it by) a random number (sine and cosine of four angles), transforming to a time domain (inverse Fourier transform), converting to analog and subsequently exciting an electronically driven shaker table.

SUMMARY OF THE INVENTION

A low-cost, multi-axis, quasi-random vibration system includes pneumatically driven vibrators coupled to a resonating, self-attenuating shaker structure to achieve a frequency spectrum and acceleration-level control of a broadband quasi-random vibration output in the frequency range, for example, from 40 Hz to 2 kHz for vibration testing of equipment. The shaker structure consists of flexible interconnected structures whose primary or driving structure acts to mechanically process the vibratory input of the coupled vibrators and whose supporting or driven structure supplies a further vibrational processing to supply the test item with multi-axis multimodal input. Automatic control and pseudo-random modulation of air pressure of the pneumatic vibrators provide closed-loop broadband acceleration-spectrum control and spectrum smearing to enhance frequency content and to prevent the shaker from locking onto any particular vibration frequency, especially a natural frequency of the shaker. Control is achieved in and about three orthogonal axes simultaneously, thus affording a realistic simulation of operational environments. The vibrators' vibration frequency is modulated by means of a variable-area orifice in the pneumatic line located between the air supply and the pneumatic vibrators. A pseudo-random change in the orifice area is made automatically, for example, every 2 to 3 seconds, by a preprogrammed microprocessor-controlled flow control mechanism.

More specifically, the control system controls vibration to a pre-selected value by periodically sensing the vibration input to the test item, computing the root-mean-square response, comparing it with a preselected root-mean-square value, and digitally adjusting the air supply to the pneumatic vibrators. In addition, the predetermined spectrum of the shaker system is controlled mechanically.

In the overall performance of the vibration scheme, the output of the pneumatic vibrators is altered through pressure modulation of the vibrators, to result in effective augmentation of the output and in vibration spectrum smearing. Pressure modulation is achieved by modulation of the area of an orifice located between the air supply and the pneumatic vibrator drive manifold. A microprocessor is programmed with a semi-emphirical relationship between the orifice area and the test-item frequency response. During a test, the microprocessor periodically varies the orifice area by means of an air-pressure-modulation flow-control mechanism and drive circuitry using a pseudo-random number algorithm to produce a desired, e.g., uniform, distribution of values of the drive-manifold pressure.

Pressure variations produce changes in acceleration response of the test item. The advantage of spectrum smearing and any problems resulting from accel-eration variation are reconciled through an automatic control system. Automatic level control is based on periodic comparison of an estimate of the root-mean-square acceleration with the test-level setting. Acceleration feedback from the three orthogonal axes is fed through a low-pass filter (e.g., 2 kHz) and a sample-and-hold function to a multiplexer, and digitized by means of an analog-to-digital converter. The unfiltered signals also are fed through an auxiliary multiplexer to a pseudo-peak detector, from which is derived a fast-action over-test detector function. The microprocessor subsystem performs the balance of the data acquisition. Each of the digital accelerometer signals is processed to create an estimate of the root-mean-square acceleration level. The drive pressure required for the specified test level is adjusted periodically during a test by automatic servo adjustment of a pressure regulator through appropriate drive circuitry.

It is, therefore, an object of the invention to produce simultaneous multi-axial broadband quasi-random vibration.

Another object is to provide a vibration system which, in comparison with conventional systems, is of low cost.

Another object is to provide a microprocessor control system which allows for fully automatic calibration, self-test and fail-safe functions.

Another object is to provide such a vibration system which is readily adaptable to a wide range of product sizes and shapes.

Another object is to provide a compact, self-contained system which requires only normal shop air and electrical power.

Another object is to provide a simple and inexpensively maintainable system.

Other aims and objects as well as a more complete understanding of the present invention will appear from the following explanation of exemplary embodiments and the accompanying drawings thereof.

BRIEF DESCRIPTION OF THE DRAWINGS

FIGS. 3-5 depict a particular means for obtaining a variable-area orifice by a combination of a specially shaped cam and orifice opening;

DESCRIPTION OF THE PREFERRED EMBODIMENTS

Figure 1:
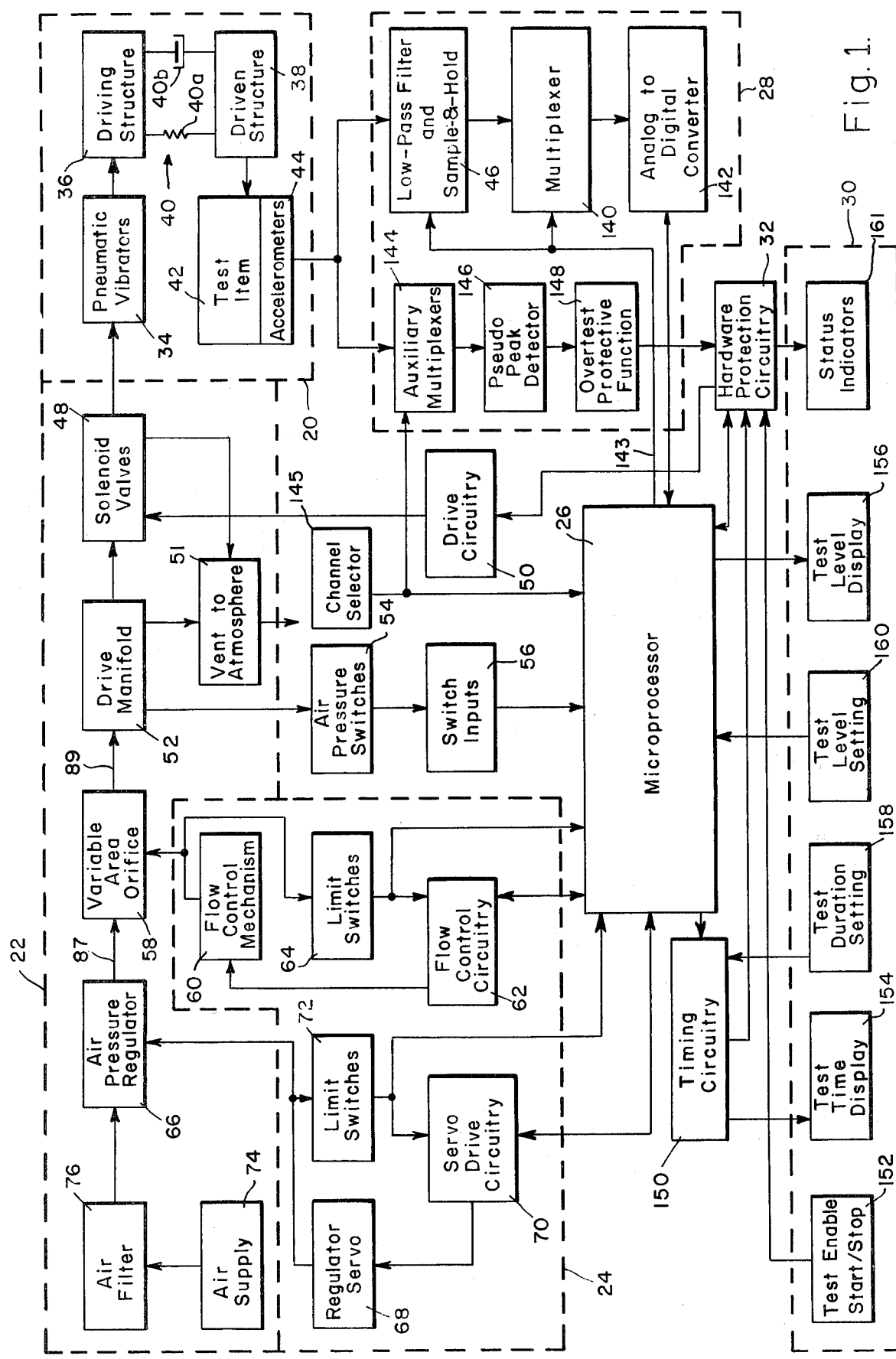
FIG. 1 illustrates the overall facility and modulating system therefor in block diagram.

Referring now to FIG. 1, a quasi-random pneumatic vibration facility and automatic frequency modulating system is illustrated as being subdivided into several major subsystems including a shaker table assembly 20, an air pressure and flow control mechanism 22 pneumatically coupled to shaker table assembly 20, air pressure and flow control drive circuitry 24 coupled to mechanism 22 for regulating the pressure level and quantity of air delivered therethrough, a microprocessor 26 coupled to air pressure and flow control mechanism 22 for insuring that the pressure level and quantity of air delivered to shaker table assembly 20 is sufficient for driving the same, a feedback and over-test protective subsystem 28 electrically coupled between shaker table assembly 20 and microprocessor 26 to insure that the microprocessor is provided with the necessary feedback information to properly function, operator interface subsystem 30 for enabling an operator to establish the proper test parameters as well as to be informed thereof, and hardware protection circuitry 32 interposed between microprocessor 26 and drive circuitry 50 for control of "ON-OFF" solenoid valves 48 in air pressure and flow control mechanism 22 to protect the system from excessive vibrational levels that might otherwise injure the device being tested. Air pressure switches 54 and switch inputs 56 couple a drive manifold 52 in mechanism 22 to microprocessor 26.

In initially describing the system operation, the output of shaker table assembly 20 with a test item thereon is fed back through subsystem 28 and compared with a preselected vibrational setting in microprocessor 26 to generate an error signal which, in turn, is applied through air pressure and flow control circuitry 24 to air pressure and flow control mechanism 22. Mechanism 22 then causes structure in shaker table assembly 20 to vibrate a specimen in a controlled manner, and the shaker's vibratory output is fed back as described above.

Shaker table assembly 20 includes a plurality of pneumatic vibrators collectively identified by indicium 34 which are coupled to a driving structure 36. The driving structure is caused to assume varying modes of vibration based upon the excitation inputs from the vibrators in conjunction with the specifically designed physical configuration and material properties. The dynamic distortions resulting from the many modes of vibration are modified and translated to a driven structure 38 by means of a visco-elastic construction 40 having, for example, resilient components 40a and damping components 40b. Driven structure 38, therefore, will assume complex modes of dynamic distortion which are superpositions of forced and natural vibration modes of driven structure 38 and of the dynamic translations imparted from driving structure 36. The vibrational output from driven structure 38 is sensed by accelerometers 44 which are fed into feedback and overtest protective subsystem 28. A more complete description of the structure of shaker table assembly is described in the following patent applications, filed herewith: "Multi-Axis, Complex Mode, Pneumatically Actuated Plate/Space Frame Shaker for Quasi-Random Pneumatic Vibration Facility" Ser. No. 897,823, "Multi-Axis, Complex Mode, Pneumatically Actuated Annular Shaker for Quasi-Random Pneumatic Vibration Facility" Ser. No. 897,824 and "Nodal/Modal Control and Power Intensification Methods and Apparatus for Vibration Testing" Ser. No. 897,822, all by Charles F. Talbott, Jr.

As described therein, the basis of the mechanical vibration device embodied in shaker table assembly 20 is that a structure can be excited in many translational and rotational vibration modes, dominated by multiples of both the excitation frequency and the natural frequency of the structure. The frequencies of the first few natural modes of the structure embodied in driving structure 36 are by design not integer multiples of the primary excitation frequency obtained from pneumatic vibrators 34. The complex modal coupling between initially excited structure 36 and driven structure 38 results in a rich composite of vibratory modal history arising from individual and unified structures behavior as modified by visco-elastic coupling 40. Test item 42 is subjected to the resulting vibration spectrum. The means by which driving structure 36 and driven structure 38 are coupled makes it possible to obtain a controllable power spectrum, with specific acceleration level limits from 40 Hz to 2 kHz, which are limits of vibration frequency for typical military specifications. As further described in the accompanying applications, the elastomeric materials of construction 40 have specifically tailored shapes and properties and are inserted with associated mechanisms between the driving and driven structures. The visco-elastic transmissibility and filtering characteristics of the chosen elastomers allow a roll-off of the vibration acceleration spectrum input to the test article at or near the upper frequency limit, regardless of the high frequencies excited in driving structure 36.

Vibrators 34 preferably comprise impacting free-piston pneumatic vibrators rather than air-cushioned free-piston pneumatic vibrators, rotary pneumatic vibrators or otherwise operated vibrators, such as by hydraulic and electro-mechanical means, but those can be used if the desired types of dominant vibrational frequencies are obtainable therefrom. Impact vibrators are preferred so that the sliding piston therein impacts on at least one of the vibrator housing end surfaces after the drive gas pressure reaches some threshold. This impact gives rise to a repeatable chain of mechanical vibratory transients that are rich in harmonic content having a very broad spectral characteristic, typically covering a range from about 50 Hz to several thousand Hertz, the upper limit depending largely on the resonant characteristic of the structure on which the vibrator is mounted. It is preferred also to use different sizes and combinations of vibrators characterized by different rigid body fundamental frequencies for a given gas pressure in conjunction with the structural frequency response of the shaker components and the mass thereon. The gas pressure determines the fundamental or lowest repetition rate and the resulting impact force level. Uniform vibrational energy coupling between the shaker elements is desirable at every frequency between the lowest attainable frequency and approximately 2 kHz. However, much of the input energy is concentrated around multiples of the fundamental rigid body frequency of the free piston vibrators. This condition dictates a requirement for modulation of the drive pressure sufficient to cause an excursion of the fundamental pulse repetition frequency of 25% to 50% about the nominal. Such excursion causes a "smearing" of the frequency spectrum and assures that there is sufficient vibrational energy present for a predictable percentage of the test time at every frequency.

As stated above, pneumatic vibrators 34 are actuated by air pressure and flow control mechanism 22. Specifically, a vibrator or a group of vibrators is connected to solenoid operated air valves 48. Each air valve 48 is maintained in an open position during operation of the system, and each is coupled to a drive manifold 52 for uniform supply of air equally to all solenoid valves. If desired, a single large valve may be attached to all vibrators, or a pneumatic valve may be utilized in place of the solenoid to operate the air valve. In any case, solenoid valves are electrically operated by appropriate drive circuitry 50 which is coupled to microprocessor 26 through hardware protection circuitry 32. In the event that an overtest or other damaging conditions arise, hardware protection circuitry 32 opens the circuit between micro-processor 26 and drive circuitry 50 to close solenoid valve or valves 48 and, thereby, prevent air from being supplied to vibrators 34. In such a manner, vibratory input to shaker table assembly 20 is terminated. The signal from drive circuitry 50 also causes an atmospheric vent 51, coupled to drive manifold 52, to open, thus permitting release of pressure therefrom.

Drive manifold 52 comprises a plenum to insure a uniform flow of air equally to all vibrators. Its only constraint is that it must be sufficiently small so as not to be too slow in response to changes in air pressure level and quantity of air. Air pressure switches 54 and switch inputs 56 are coupled in series between drive manifold 52 and micro-processor 26 and may be used for one or more purposes. They can act as limit switches to cut off the flow of air to the manifold in the event that the air pressure drops below a preset pressure, to cut off air flow if the pressure is too high, and to assure that the pressure is adequately high in the drive manifold prior to commencement of the test. If desired, pressure transducers may be utilized instead of switches in order to provide a means by which the exact value of pressure can be determined or be set for automatic operation of the system at any acceleration level or levels.

Figure 9:
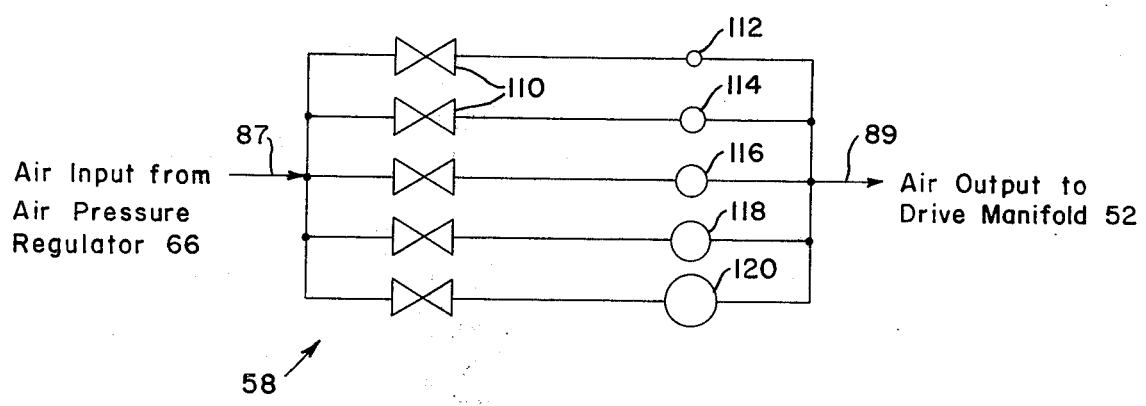
FIG. 9 depicts an alternative means for obtaining a variable-area orifice utilizing multiple selectable flow-control orifices.

Air to drive manifold 52 is supplied through a variable area orifice 58 through a conduit 89. Its purpose is to vary the drive manifold pressure level with respect to time so that a greater or lesser amount of air will be supplied to pneumatic vibrators 34 which, in turn, will then cause different levels of vibration to be exerted against driving structure 36. Variable-area orifice 58 is driven by a flow-control mechanism 60 which, in turn, is driven by variable flow-control drive circuitry 62 from microprocessor 26. The specific configuration of variable-area orifice 58, whether as depicted in FIGS. 3–5 or 9, will determine the particular structure of flow control mechanism 60. When configured as a cam and orifice mechanism as shown in FIGS. 3–5, flow-control mechanism 60 takes the form of a shaft having limited rotational movement, such as provided by limit switches 64. For other kinds of variable-area orifices, such as shown in FIG. 9, limit switches 64 may be dispensed with.

The average pressure of air over a period of time is controlled by an air-pressure regulator 66 which, in turn, is controlled by a regulator servo 68 and air-pressure regulator servo drive circuitry 70 operated from microprocessor 26. Since regulator servo 68 is mechanical in operation, it requires limit switches 72 to prevent overtravel of its mechanism. The purpose of air-pressure regulator 66 is to insure that the proper average flow and pressure of air be supplied via conduit 87 to variable-area orifice 58 over a period of time.

Air is supplied to regulator 66 from an air supply 74, and the air is filtered through an air filter 76.

In further partial explanation of the operation of the system, before vibrational testing of test item 42 occurs, the pressure in drive manifold 52 is sensed through air pressure switches 54 so that air pressure regulator 66 can be set to supply that pressure and quantity of air which is required to start pneumatic vibrators 34 when the vibration test begins. After the start of the test, the average of the acceleration levels for a set period of time, e.g., 2½ minutes, is sensed by accelerometers 44 to operate air pressure regulator 66. Meanwhile, the program input from microprocessor 26 to variable area orifice 58 continues at a rapid pace, e.g., 2¾ seconds per pressure change. The variable area orifice is varied while the average acceleration levels are taken, in order to control the average pressure of air supplied to the pneumatic vibrators, so that the average acceleration response (Grms) is controlled.

Figure 2:
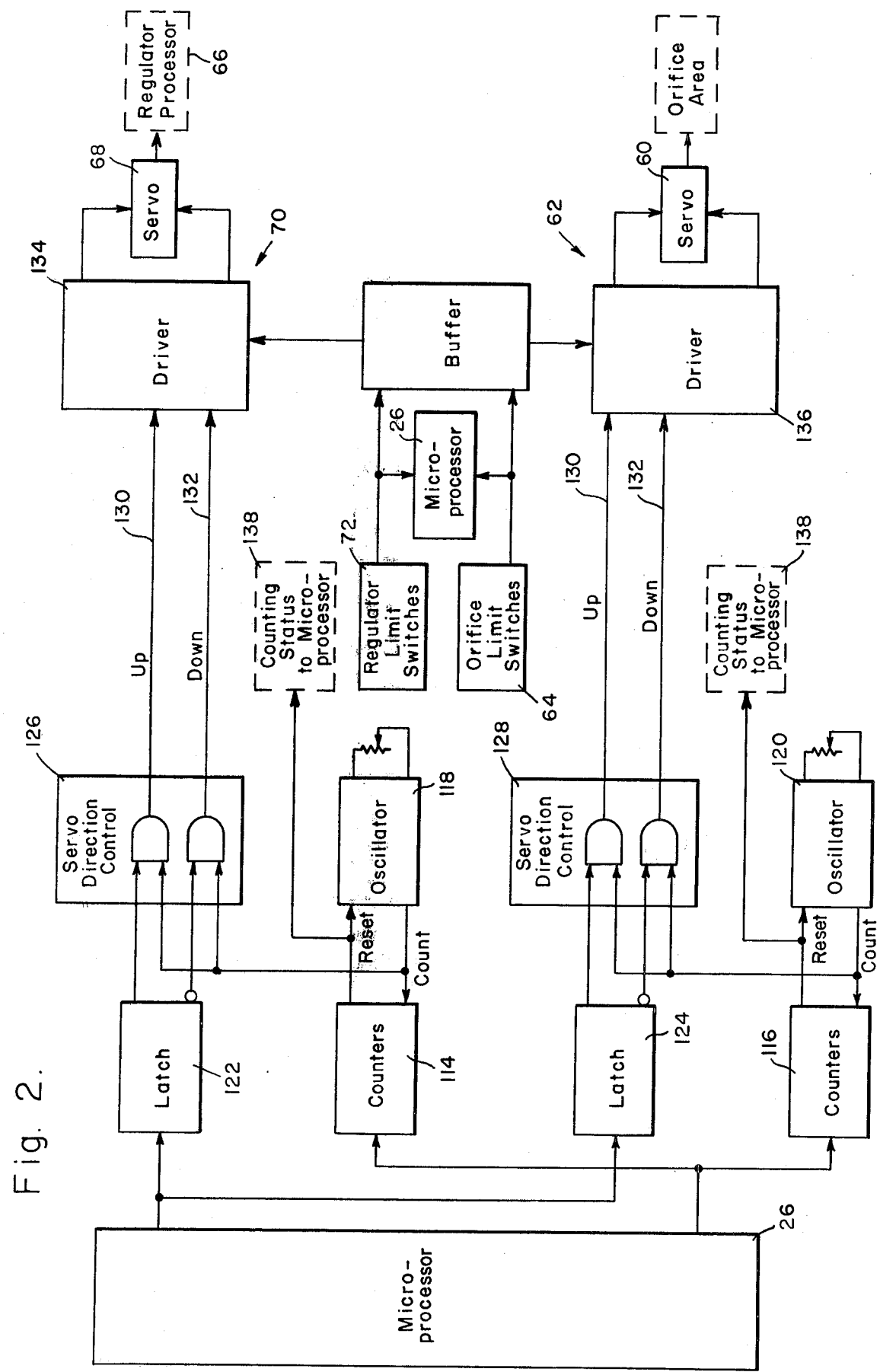
FIG. 2 illustrates portions of the block diagram of FIG. 1 in greater detail.

The electrical functions and circuitry of the system depicted in FIG. 1 are shown in greater detail in FIG. 2. Air pressure and flow control circuitry 24, which is shown in FIG. 2, causes a stepping motor (configured as a specific embodiment of flow control mechanism 60) to rotate a cam or its equivalent predictably in accordance with the computer program in microprocessor 26. Also, circuitry 24, through the intermediary of air-pressure regulator servo drive circuitry 70, causes air regulator 66 to change the pressure of the air supplied to variable-area orifice 58 from a pressure switch before the test, and from accelerometers 44 after start of the test.

Specifically as illustrated in FIG. 2, microprocessor 26 is coupled to a pair of counters 114 and 116. For each counter, whether for regulator 66 or orifice 58, at zero count oscillators 118 and 120 respectively coupled thereto are reset and do not oscillate. Micro-processor 26 through latches 122 and 124, respectively coupled to servo direction controls 126 and 128, latches or establishes the direction in which the pressure or the orifice area, as the case may be, will increase or decrease. Servo direction control 126 and 128, which may comprise a pair of NAND gates, also are coupled to receive the signals transmitted between counters 114 and 116 and oscillators 118 and 120 and further are coupled to drivers 134 and 136 by "up" (increase) and "down" (decrease) paths 130 and 132. Upon commencement of counting, the oscillators send a pulse train over only one "up" path 130 or "down" path 132, respectively for the regulator or the variable area orifice, to drivers 134 and 136 in order to drive servos 68 and 60 in one of a clockwise or counterclockwise direction.

Based upon the signal from the microprocessor and the beginning of counting, that is, the number of steps servos 60 or 68 are to move, the particular oscillator begins to oscillate. The oscillation output decrements the counter until it again reaches zero count. At the same time, the signal from counters 114 and 116 are fed back to microprocessor 26 as indicated by boxes 138 to inform the microprocessor whether or not the oscillators are operating.

Coupled with this operation, regulator and orifice limit switches 72 and 64 are actuated by the appropriate servo screw or cam to limit travel thereof. The switches are adapted to prevent signals from operating the servos beyond what is desired, as well as to so forward this information to microprocessor 26.

The operation of feedback and overtest protective subsystem 28 is more fully described with respect to FIG. 1. Subsystem 28 receives signals from accelerometers 44 and provides two functions, a first being overtest protection and the second being notification of vibration test information to the microprocessor.

This latter function employs low-pass filter and sample-and-hold function 46, a multiplexer 140, and an analog-to-digital converter 142. Their purpose is to digitize the analog signal from the selected accelerometers for the purpose of determining the root-mean-square acceleration level of the test item. For a multi-axis screening facility, an average of two to six accelerometer signals from at least two of the three orthogonal directions is required. Multiplexer 140 permits handling of signals simultaneously from more than one axis. In operation, microprocessor 26 through electrical connection 143 addresses the sample-and-hold function in component 46 to have it either sample or hold the analog accelerometer signal, as well as to address mutiplexer 140 to select the channel or accelerometer signal applied to analog-to-digital converter 142. A channel selector 145 determines the number of accelerometer channels which microprocessor 26 is to address to multiplexer 140.

As shown in FIG. 1, subsystem 28 has a secondary function to provide for overtest protection, utilizing auxiliary multiplexers 144, a pseudo-peak detector 146, and an overtest protective function 148. These components are of conventional design. In operation, channel selector 145 determines the number of accelerometer channels which auxiliary multiplexer 144 scans so that unfiltered signals from accelerometers 44 are properly fed to these components and therefrom to hardware protection circuitry 32. In the event that the vibrational level of shaker table assembly 20 becomes too great, as sensed by accelerometers 44, this information is processed to permit hardware protection circuitry 32 to interrupt the operating signal from microprocessor 26 to solenoid valves 48, thereby to prevent further supply of air to pneumatic vibrators 34.

Air pressure switches 54 are used to determine what the drive manifold pressure is and to preset the pressure at a desired level. At least two switches are utilized for nominal and low pressure, respectively to preset the pressure and to turn the test off at a selected low pressure to prevent vibration below a particular switch setting. If desired, a high pressure switch may be used to prevent vibration above a specified level.

The operator interface subsystem, denoted generally by indicium 30, is coupled to microprocessor 26, timing circuitry 150, and hardware protection circuitry 32 and embodies those functions which the operator actuates or is displayed. A test-enable start/stop function 152 is embodied as solenoid-valve control circuitry to begin or end the test. A test-time display 154 and a test-level display 156 both comprise numeric indicators in which one shows the time and the other shows the level of RMS acceleration during test. A test-time duration setting 158 and a test-level setting 160 comprise, for example, thumb-wheel switch arrays respectively for setting the duration and level of the test.

Timing circuitry 150 is coupled between microprocessor 26 and hardware protection circuitry 32 for the purpose of enabling the operator to set the duration of the test and to enable the control system to stop the vibration after the test time period has elapsed. It comprises a plurality of counters connected in such a manner that test duration setting 158 presets the counter on command from the microprocessor. The output from the counter is connected to display 154 to indicate the time remaining for the test. Upon reaching zero time at the end of the test period, a signal is sent to hardware protection circuitry 32 which causes the test to stop. The same signal is also forwarded to microprocessor 26.

The purpose of hardware protection circuitry 32 is to interconnect the various failure-detect circuitry, the operator inputs, and microprocessor 26 (see FIG. 1). Its failure-detect control is derived from the overtest protective function, the timing circuitry, and the test enable, start and stop functions. When the test is enabled and started, microprocessor 26 has full control of solenoid valves 48, subject to hardware protection circuitry 32. If the overtest protection function 148 detects an overtest condition, for example, the microprocessor loses control of the servo valve. Identical results occur when the timing circuitry times out. The status of hardware protection circuitry 32 is indicated by status indicators 161.

Microprocessor 26 has several functions. It modulates the air pressure, it receives and processes vibrational signals from the accelerometers, and it performs system and self-tests. Air pressure modulation occurs by varying the orifice area openings of orifice 58. It receives and processes accelerometer signals from accelerometers 44, as first processed by low-pass filter and sample-and-hold function 46, multiplexer 140, and analog-to-digital converter 142. Based upon the receipt of the accelerometer signals, the microprocessor is capable of detecting accelerometer anomalies. It also estimates the Grms level which is displayed on test-level display 156, which is compared with internally programmed upper and lower limits to stop vibration if the Grms exceeds the program limits, and which is used to adjust air pressure regulator 66. Its system and self-tests are to determine the occurrence of circuitry or mechanical failure.

Such microprocessors are conventional, an 8-bit microprocessor being suitable for present purposes of the invention, although other sizes can be used. Its major components include a random-access memory (RAM) and a read-only memory (ROM), with input/output latches as required. A minicomputer or microcomputer also may be utilized.

Figure 10:
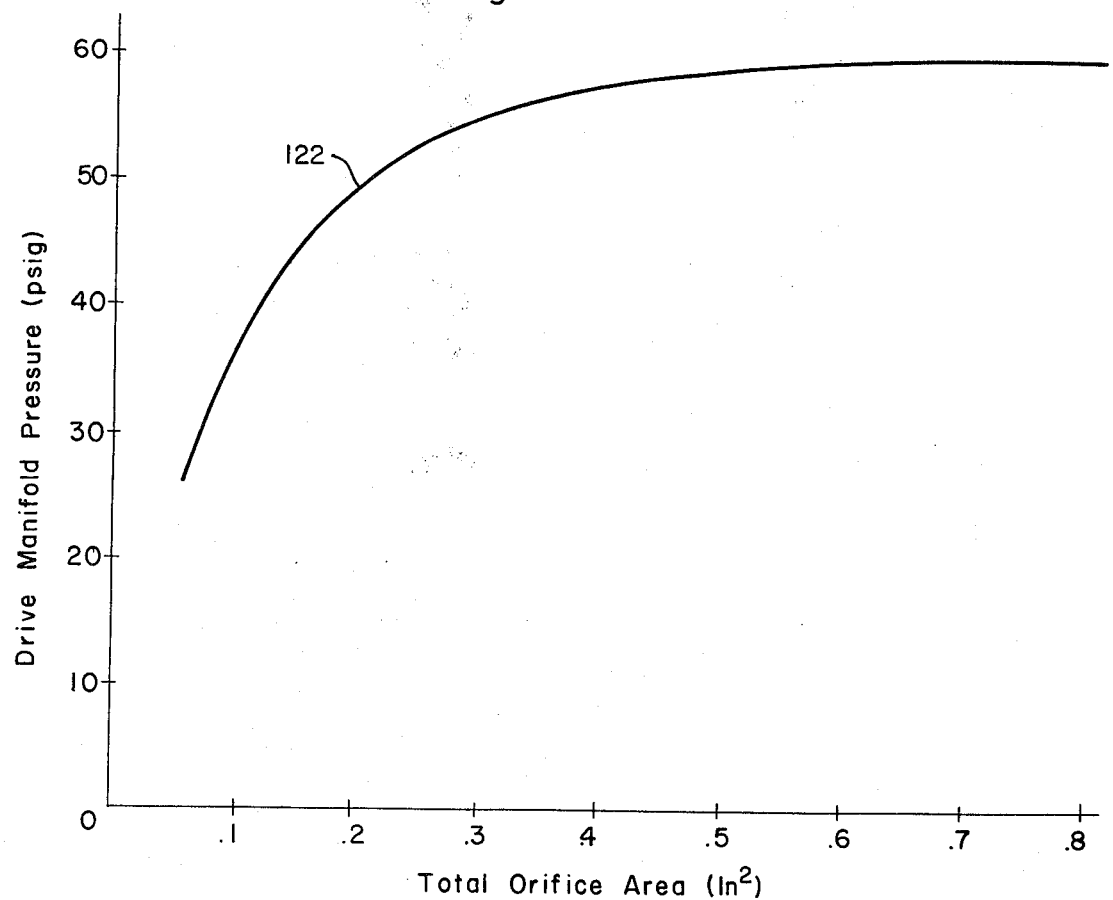
FIG. 10 depicts a means by which the variable area orifice structure of FIG. 9 can be constructed.

In operation, the microprocessor is programmed to continuously change the orifice area in variable-area orifice 58 every 1 to 2 seconds in order to preclude shaker table assembly 20 from locking onto any particular vibration, especially a natural mode thereof. These changes, effected in variable area orifice 58, are pseudo-random and have any desired distribution, e.g., uniform. As stated above, by pseudo-random, it is meant that there is a mathematical method or algorithm for selecting a sequence of numbers. This sequence is random in the sense that it obeys certain statistical laws of randomness. By pseudo, it is meant that the randomness is not purely random because the sequence results from predetermined calculations. By uniformity, it is meant that every drive manifold pressure is equally likely to be selected. A finite number of opening positions has been selected to be 128, as an example. Accordingly, the random-number algorithm in the microprocessor program is selected according to:

$$N_{I+1} = [J + KN_I] \text{ modulo } 127$$

where $N_I$=Random number and $0 \leq I \leq 127$, and
  J = a constant
  K = a constant For the cam of FIGS. 3–5, $N_I$ defines the cam angular position. For the selectable orifice of FIG. 9, $N_I$ defines the desired manifold pressure. To obtain the desired manifold pressure, for each orifice area, there is a combination of orifices which are open. In the example given, 128 positions of orifice area combination can be used, and each position defines a particular orifice area. Since the relationship between the orifice area and the manifold pressure is known empirically (e.g., see FIG. 10), it is possible to correlate $N_I$, the desired instantaneous maifold pressure, to the desired instantaneous combination of open orifices.

As stated above, variable area orifice 58, its flow control mechanism 60 and limit switches 64 (if needed) may be embodied as the structure depicted in FIGS. 3–5 or FIG. 9. FIGS. 3–5 depict a cam-orifice mechanism 78, comprising a cam-shaped plate 80 and an orifice opening 82 in a supporting wall 84, all enclosed in a housing 85 having conduits 87 and 89 respectively coupled to air pressure regulator 66 and drive manifold 52. A drive shaft 86 is coupled to cam 80 and is driven by a stepping servo motor 88. Thus, mechanism 78 defines one embodiment of variable-area orifice 58, while drive shaft 86 and motor 88 constitute one embodiment of flow control mechanism 60 of FIG. 1. In addition, limit switches 64 of FIG. 1 are also depicted in FIG. 5 as limit switches 64a and 64b which define the end points of rotational travel in FIG. 5 of plate 80 in that extension 80a thereof is disposed to come into contact with the limit switches.

Cam-shaped plate 80 and orifice opening 82 are oriented in such a way that edge or periphery 90 of the plate is adapted to cover or uncover the orifice opening to a greater or lesser extent. The shapes of both plate periphery 90 and orifice opening 82 are configured such that, as the angular position of the plate changes with respect to the opening, the orifice area changes according to a pre-determined relationship. During a test, the pseudo-random number algorithm in microprocessor 26 causes plate 80 to be rotated every 2¾ seconds with respect to orifice opening 82, either clockwise or counter-clockwise, so that the orifice area defined by the combination of edge 90 and orifice opening 82 randomly opens to a greater or lesser extent to permit a pseudo-random distribution of amounts of air to be delivered to pneumatic vibrators 34.

The shape of plate edge 90 (taken in conjunction with the shape of opening 82) is derived as follows, reference being directed to FIGS. 6–8. The basic relationships are outlined in FIG. 6, which is based on the concept that modulation of the vibration frequency is achieved by modulation of the area of the orifice defined by the cooperation between opening 82 and cam edge 90. An analytical formula [1] was derived relating the air flow rate through the orifice to the orifice area and the pressure in the drive manifold downstream of the orifice, as outlined in box 92 of FIG. 6. An empirical formula [2], derived from the relationship shown in box 94, was obtained relating the flow rate through the pneumatic vibrators, which equals the flow rate through the orifice in steady state, to the drive manifold pressure. These formulae [1] and [2] are combined to derive an algorithm [3] (box 96), a semi-empirical formula, which defines the relationship of drive manifold pressure to orifice area. By combining algorithm [3] with a further empirical relationship (box 98) of test item frequency response to drive manifold pressure, the desired relationship (box 100) between test item frequency response and orifice area is derived.

Specifically, to derive empirical formula [2] (box 94 of FIG. 6), test results from one or more particular vibrators were used to derive a graph of mass flow rate per actuator, in terms of standard cubic feet per minute (SCFM), versus drive manifold pressure (psig). For each type of vibrator shaker table assembly, a straight line curve exists; therefore, three curves 102, 104 and 106 for different shaker table assemblies are depicted in FIG. 7 and represent the averages respectively of two or more pneumatic vibrators except curve 102 which is for a single vibrator. Empirical formula [2] is derived directly as the mathematical representation of these straight line curves, which were taken from vibrators on shaker tables such as depicted in the V-shaped plate and skewed V-shaped plate constructions depicted in co-pending application Ser. No. 897,823 except curve 102 which is for a single vibrator.

Analytical formula [1] (box 92 of FIG. 6) was calculated from the relationship of air flow rate through the orifice versus the orifice area and drive manifold pressure, as follows:

$$m = 31.14 C_D M/(1 + 0.2M^2)^3 p_u A \quad [1]$$

where m = flow rate in standard cubic feet per minute (SCFM), $C_D$ = function of $p_u/p_d$ obtained from experimental data in J. A. Perry "Critical Flow Through Sharp-Edged Orifices", Trans. ASME, Vol. 71, pp. 757–764, October 1949.

M = Mach number of flow through the orifice, given by $$M = \begin{cases} \sqrt{5[(p_u/p_d)^{0.286} - 1]} & , p_u/p_d \leq 1.893 \\ 1 & , p_u/p_d \geq 1.893 \end{cases}$$

$p_u$ = pressure upstream of orifice 58, as controlled by pressure regulator 66, in psia $p_d$ = drive manifold pressure in psia, and A = orifice area, in square inches.

Figure 6:
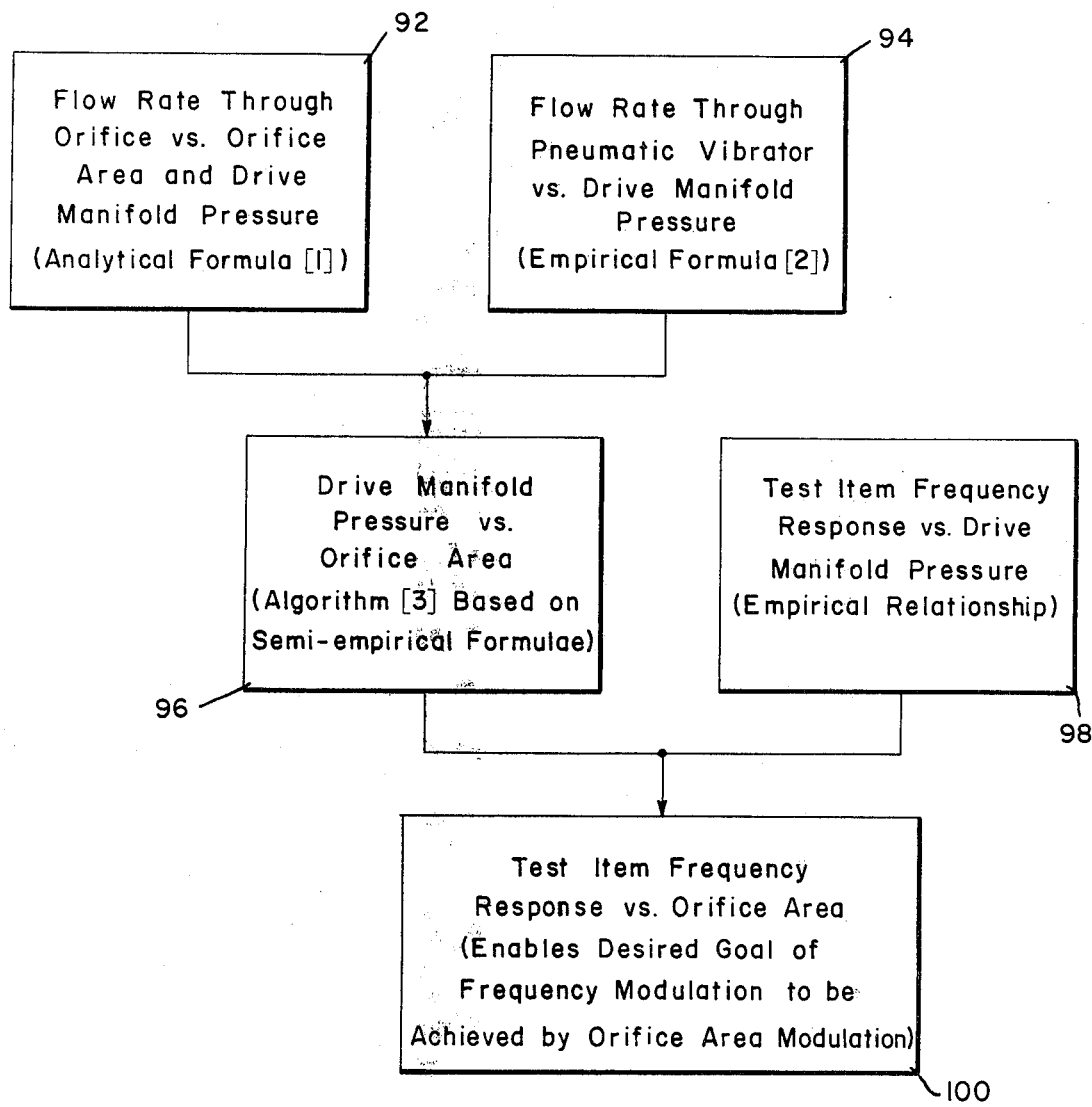
FIGS. 6-8 depict a means by which the specially shaped cam of FIGS. 3-5 can be formed.
Figure 7:
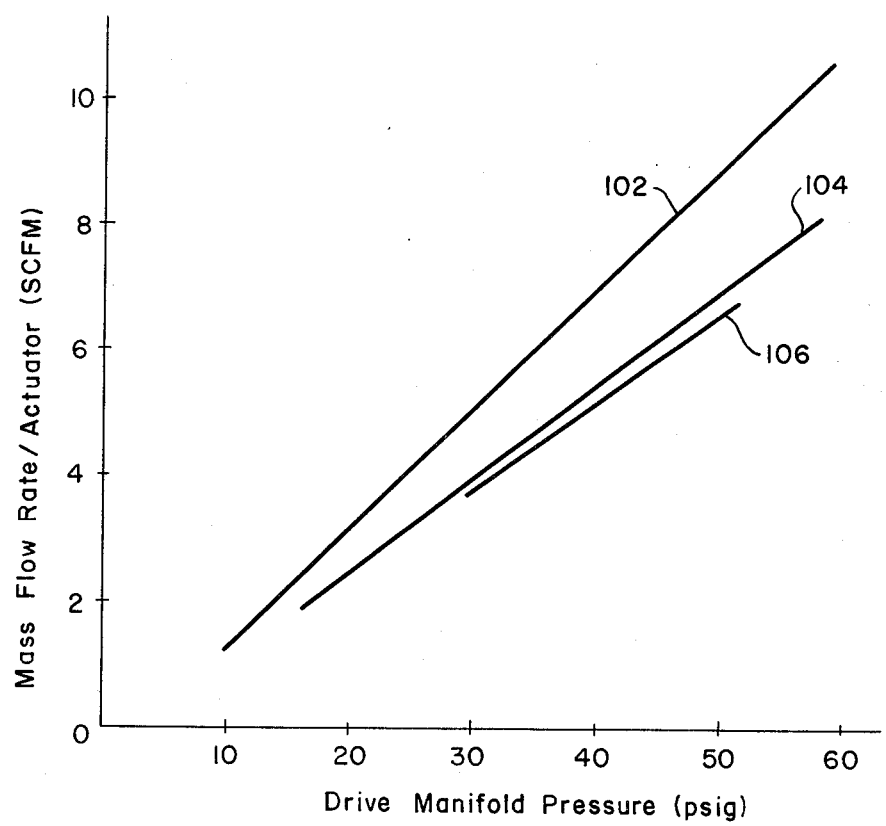

Empirical formula [2] (box 94 of FIG. 6), as obtained from curve 104 depicted in FIG. 7, is:

$$m = [1.9 + (0.151)(p_d' - 16.5)]N \quad [2]$$

where

N = number of vibrators $p_d'$ = drive manifold pressure, in psig

Combining formulae [1] and [2], algorithm [3] (box 96 of FIG. 6) is shown as follows:

$$A = \frac{[1.9 + (0.151)(p_d' - 16.5)] N}{31.14 \, C_D \left[ \dfrac{M}{(1 + 0.2M^2)^3} \right] p_u}$$

Figure 8:
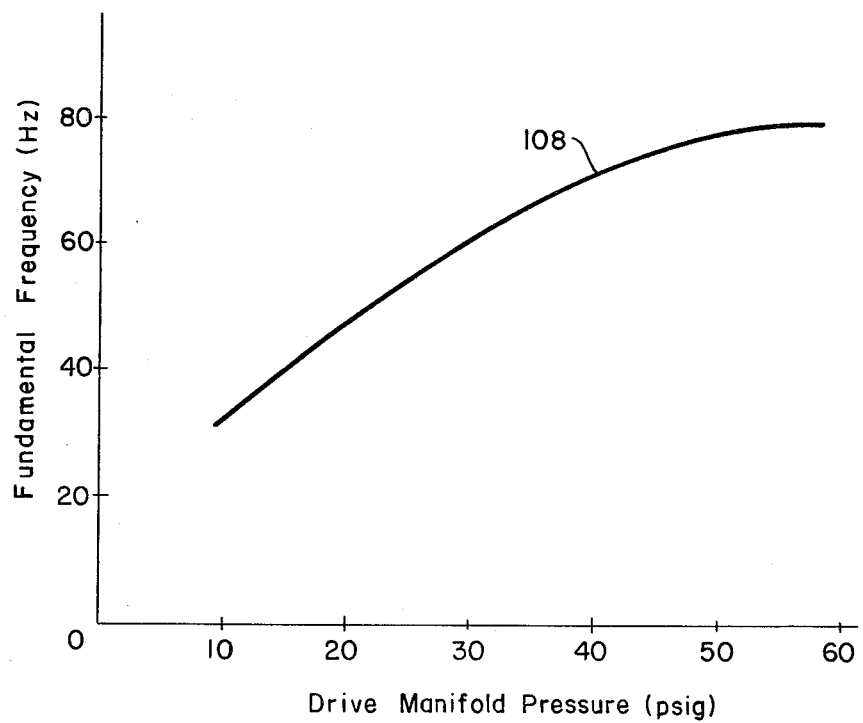

The empirical relationship as shown in box 98 of FIG. 6 of the test item frequency response versus drive manifold pressure is obtained from experimental data in which a representative plot 108 thereof is depicted in FIG. 8. The empirical mathematical relationship, which is derived from plot 108, is combined with algorithm [3] (box 96 of FIG. 6) to obtain the relationship of the test-item frequency response versus orifice area, as depicted in box 100 of FIG. 6, which enables one to achieve the desired goal of frequency modulation by orifice area modulation. From this information, plate edge 90 in conjunction with orifice opening 82 is configured.

In the design with respect to the shape of cam-shaped plate 80, the design desired was one which would permit the drive manifold pressure to be a linear function of the angular position of the plate. Since the orifice area is a non-linear function of the plate's angular position, the plate's shape had to be designed as illustrated. The decision to utilize the linear function was based upon the belief the the Grms response was a linear function of the drive manifold pressure and that the programming of a linear function would be relatively simple vis-a-vis other functions. It is to be understood, however, that if other than a linear function is desired, for whatever reason, then the shape of plate 80 and the configuration of its orifice opening 82 can be designed accordingly.

In a like manner, an area orifice configuration may utilize any other mechanism, such as depicted in FIG. 9, in which a plurality of solenoid operated valves 110 permits air to flow through one or more differently sized ports 112, 114, 116, 118 and 120. If desired, ports 112–120 may be of the same size. In any event, the combination of ports is selected to provide a maximum total orifice area, a minimum total orifice area, and selected area sizes inbetween. Such port or valve mechanisms are exemplified in U.S. Pat. Nos. 3,726,296; 3,746,041; 3,772,877; 3,785,389; and 3,875,955. By means of the above-described combined analytical/experimental program, a quantitative relationship between total orifice area and resultant drive manifold pressure is established. This semi-empirical relationship is plotted from curve 122 taken from an illustrative design depicted in FIG. 10. During a random-vibration test, it is desired to have, for example, a uniform pseudo-random distribution of values of the drive manifold pressure, which is achieved by selecting an appropriate non-uniform pseudo-random distribution of values of the total orifice area from the graph in FIG. 10.

Although the invention has been described with reference to particular embodiments thereof, it should be realized that various changes and modifications may be made therein without departing from the spirit and scope of the invention.

What is claimed is:

1. A vibration system comprising:
   means for supporting a test item;
   vibrators coupled to said supporting means and operable therewith for generating quasi-random, simultaneous multi-axis vibration in the test item;
   means coupled to said vibrators for automatically causing said vibrators to vary their vibratory output and thereby to enhance the randomness in the multi-axis vibration; and
   means defining a closed loop with said vibrators for sensing and controlling the level of the multi-axis vibration.

2. A system according to claim 1 wherein vibrator driving means are coupled to said vibrators and wherein said closed loop means comprises:
   means for detecting the vibration input to the test item;
   means coupled to said detecting means for comparing said vibration input with a predetermined vibration input and for generating an error signal based on said comparison;
   means for processing the error signal; and
   control means coupling said processing means to said driving means.

3. A system according to claim 2 further comprising means for causing said closed loop means means to operate pseudo-randomly and thereby to drive said driving means and said vibrators, operable with said supporting means, to generate the quasi-random, simultaneous multi-axis vibration in the test item.

4. A system according to claim 3 wherein:
   said detecting means includes accelerometers; and
   said processing means includes means for time-averaging the output of said accelerometers.

5. A system according to claim 4 in which said vibrators comprise pneumatic vibrators and said driving means incudes a supply of air for said pneumatic vibrators.

6. A system according to claim 5 in which said driving means further includes means for variably supplying the air to said pneumatic vibrators.

7. A system according to claim 5 wherein said variable air supplying means includes means for defining at least one variable-area orifice through which the air flows.

8. A system according to claim 7 wherein said variable area orifice means comprises a plurality of solenoid-operated valves coupled together in parallel.

9. A system according to claim 7 further including:
   means for periodically varying the area of said orifice means; and
   a pressure regulator coupled between said variable-area orifice means and said air supply and operatively coupled to said error processing means, for providing a proper average flow and pressure of the air to said variable-area orifice means over a period of time which is long relative to the varying of said variable-area orifice means.

10. A system according to claims 2, 3, 7 or 9 further including:
    means defining over-test protective mechanisms coupled to said detecting means for sensing potentially damaging accelerations exerted on the test item;
    means defining a timing mechanism coupled to said processing means for setting the time for operating said vibrators; and
    means defining a hardware protection mechanism coupled between said processing means and said driving means for preventing operation of said vibrators upon the occurrence of the potentially damaging accelerations or the termination of the operating time.

11. A system according to claim 1 wherein said supporting means includes a vibration shaker for mechanically processing vibrations.

12. A method for quasi-randomly varying vibration frequencies applied to a test item comprising the steps of superimposing a number of simultaneously produced vibrations and applying the vibrations to the test item, wherein said superimposing step includes the step of varying the input to means for producing the vibration frequencies rapidly with respect to averages of acceleration levels derived from the vibrating test item.

13. A method according to claim 12 further including the step of utilizing air for driving pneumatic vibrators by which the vibration frequencies are produced.

* * * * *